United States Patent [19]

Selby

[11] 3,797,511
[45] Mar. 19, 1974

[54] COMBINATION PRESSURE-VACUUM RELIEF VENT-VALVE

[75] Inventor: Roger M. Selby, Munster, Ind.

[73] Assignee: Union Tank Car Company, Chicago, Ill.

[22] Filed: Jan. 3, 1972

[21] Appl. No.: 214,905

[52] U.S. Cl................ 137/71, 137/493.2, 137/526, 137/542
[51] Int. Cl............................................ F16k 17/16
[58] Field of Search........ 220/89 A; 137/68, 69, 71, 137/493.1, 493.2, 542, 543.13, 512.2, 493, 215, 526

[56] References Cited
UNITED STATES PATENTS

| 1,751,684 | 3/1930 | Diederich | 137/526 X |
| 3,693,644 | 9/1972 | Dilorenzo | 137/71 |
| 21,535 | 9/1858 | Hardy et al. | 137/493.2 |
| 2,562,672 | 7/1951 | Kunert et al. | 137/71 |
| 2,781,941 | 2/1957 | Lindsay | 220/44 R |
| 2,960,996 | 11/1960 | Haselton | 137/512.2 X |

FOREIGN PATENTS OR APPLICATIONS

| 23,121 | 3/1949 | Finland | 137/493.2 |
| 535,812 | 1/1957 | Canada | 137/542 |

Primary Examiner—Alan Cohan
Assistant Examiner—Richard Gerard
Attorney, Agent, or Firm—Joel E. Siegel; Charles M. Kaplan

[57] ABSTRACT

A combination pressure-vacuum relief vent-valve for use in preventing excess pressure or vacuum within a railway tank car. The vent-valve includes a valve chamber having a first end adapted to communicate with the interior of the tank and a second end adapted to communicate with the atmosphere. Valve plug means is positioned within the valve chamber having a first position preventing fluid communication therethrough and a second position permitting fluid communication therethrough. The plug means is spring biased towards its first position in a manner which permits the plug means to assume its second position, and thereby relieve vacuum in the tank, only when the pressure differential between the first and second ends of the chamber exceeds a predetermined value. The plug means further includes a frangible element associated therewith to relieve excess pressure build up in the tank.

6 Claims, 1 Drawing Figure

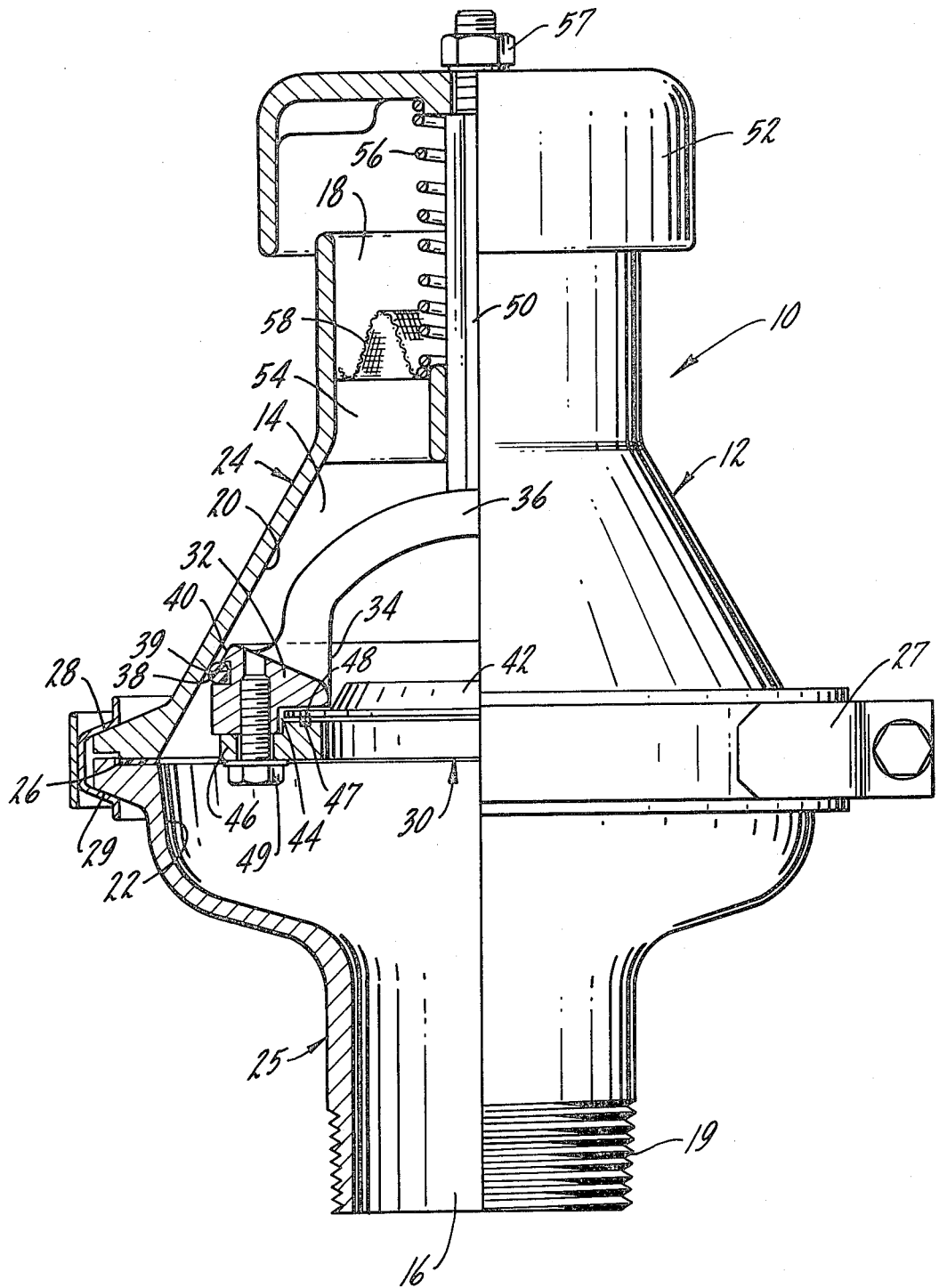

COMBINATION PRESSURE-VACUUM RELIEF VENT-VALVE

BACKGROUND OF THE INVENTION

This invention relates to pressure relief vents and vacuum relief valves for vessels and, in particular, to an improved combination pressure-vacuum relief vent-valve for use in preventing the build up of excess pressure or vacuum within a railway tank car. Although the invention will be described in the environmental context of a railway tank car, it should be understood that it may be advantageously employed in connection with many other types of storage or transport vessels containing fluids or granular ladings.

A lading being transported in a railway tank car, as for example a volatile liquid, may under certain conditions create a pressure within the tank which exceeds a maximum permissible level dictated by the design characteristics of the tank and the materials from which it is formed. Accordingly, it has long been the practice to provide a device such as a safety valve or vent which automatically vents the tank to atmosphere when the maximum permissible pressure level is exceeded, thus preventing tank damage or failure. One common type of pressure relief vent designed for this purpose has involved the use of a frangible element, such as a thin lead disc, one side of which is in fluid communication with the interior of the tank and the other side of which is in fluid communication with the atmosphere. Thus, when the pressure within the tank exceeds the maximum permissible level, the frangible element ruptures, allowing fluid within the tank to escape to the atmosphere and thus reducing the internal tank pressure.

Similarly, under certain conditions the fluid being transported in a railway tank car may create a vacuum within the tank which may exceed design characteristics of the tank. It has been the practice to provide a vacuum relief valve which automatically vents the tank to atmosphere when the pressure within the tank reaches a predetermined sub-atmospheric pressure condition. It thus has been the practice to provide separate pressure relief vents and vacuum relief valves to protect against excess pressure and vacuum. The present invention combines these two safety devices into a single device in a manner which eliminates one opening into the tank and its associated nozzle.

SUMMARY OF THE INVENTION

It is a primary object of the present invention to provide a combined pressure-vacuum relief vent-valve that is characterized by simplicity, reliability and low manufacturing cost.

Another object is to provide a combined pressure-vacuum relief vent-valve for tanks and the like which utilizes a frangible element to ensure that the pressure within the tank does not exceed a predetermined maximum value.

A further object is to provide a vent as above which permits the frangible element to be quickly and easily inspected and/or replaced.

A still further object is to provide a combined pressure-vacuum relief vent-valve which permits adjustment of the degree of sub-atmospheric pressure required to open the tank to the atmosphere.

The present invention attains these and other objectives by providing a combination pressure-vacuum relief vent-valve including a valve chamber having a first end adapted to communicate with the interior of the tank and a second end adapted to communicate with the atmosphere. Valve plug means is positioned within the valve chamber having a first position preventing fluid communication between said first and second ends and a second position permitting fluid communication between said first and second ends. The plug means is spring biased towards its first position in a manner which permits the plug means to assume its second position, and thereby relieve vacuum in the tank, only when the pressure differential between the first and second ends of the chamber exceeds a predetermined value. The plug means includes a frangible element associated therewith to relieve excess pressure build up in the tank when the pressure in the first end of the chamber exceeds a predetermined maximum value. The valve chamber is fabricated in two sections selectively secured together adjacent the valve plug means to permit access thereto for inspection and or replacement of the frangible element.

BRIEF DESCRIPTION OF THE DRAWING

The foregoing objects and features of the invention will be more fully appreciated in light of the following detailed description, with illustrative reference to the drawing, in which:

The drawing is an elevational view, paritally in section, of an exemplary pressure-vacuum relief vent-valve structure in accordance with the present invention.

DESCRIPTION OF A PREFERRED EMBODIMENT

In the drawing, there is illustrated an exemplary pressure-vacuum vent-valve structure 10 constructed in accordance with the present invention. Vent-valve struture 10 includes an elongated generally cylindrical body 12 defining an interior chamber 14. Body 12 includes first and second end portions 16 and 18, respectively. End portion 16 is threaded at 19 to be received by a threaded opening in a portion of the tank wall (not shown) so as to permit fluid communication between portion 16 and the interior of the tank. It should be understood however that the body 12 could be mounted in association with other structures, such as domes or manways. Moreover, the vent-valve structure 10 could be used in connection with any type of closed container, and is not intended to be limited to the environmental context of a railway tank car.

Body 12 although indicated above as being generally cylindrical, actually bulges outward over a portion of its length where end portions 16 and 18 are joined together. Portion 18 includes surface 20 which extends upward and inward. Portion 16 includes a surface 22 which extends in a substantially vertical direction. Body 12 is preferably constructed of an upper section 24 and lower section 25 which are secured together by a coupling clamp 27 which compresses gasket 26 and provides a sealed joint. Section 24 is shaped to define surface 20 at its lower end and section 25 is shaped to define surface 22 at its upper end. Angled bearing surfaces 28 and 29 associated respectively with the adjacent ends of sections 24 and 25 are bevelled outwardly towards each other so as to move sections 24 and 25 toward one another when clamp 27 is tightened. Clamp 27 is preferably of the type disclosed in U.S. Pat No.

3,520,443, which has the same inventive entity and assignee as the present invention.

A valve plug 30 is moveably positioned within portion 18 of body 12 so as to have a first position wherein the outer periphery thereof contacts surface 20 and thus prevents the passage of fluid between ends 18 and 16, as seen in the drawing, and a second position wherein the outer periphery thereof is spaced from surface 20 and thus permits the passage of fluid between ends 18 and 16. Valve plug 30 includes an annular body portion 32 having an opening 34 therein and a supporting web 36 secured thereto diametrically spanning opening 34. The outer periphery of body portion 32 is dimensioned so as to contact surface 20 when in its up or first position and to be spaced from surface 20 when in its down or second position. An O-ring 38 is received within seat 39 about the periphery of portion 32 to effect a seal between surface 20 and portion 32 preventing fluid flow therebetween when in its first position. The upper corner 40 is bevelled substantially parallel to surface 20 in order to prevent binding between portion 32 and surface 20 when in its first position.

Closing off opening 34 is a frangible element or disc 42. Frangible element 42 is received within an annular seat 44 formed in the lower surface of portion 32. Mounted below element 42 is an annular retainer 46 within which is formed a seat 47 to receive an O-ring 48. Retainer 46 is secured to portion 32 by cap screws 49 and serves to seal the O-ring 48 and retain the frangible element 42 securely in place against seat 44. Element 42 is easily replaced by removal of screws 49 and retainer 46.

Rod 50 has one end permanently secured to web 36 and the other end retains covering cap 52 which is provided in covering relationship to end portion 18. A guide web structure 54 is provided at the upper end of surface 20 for the dual purpose of limiting rod 50 to vertical movement and for retaining a spring 56 which biases valve plug 30 towards its first position. The compression in spring 56 may be adjusted by turning adjusting lock nut 57 which secures rod 50 to cap 52. Cap 52 is dimensioned to permit fluid flow between end portion 18 and the depending sides thereof after frangible element 42 has ruptured because of excess internal tank pressure. A screen member 58 may be provided within end portion 18 to prevent foreign matter from passing therethrough and entering the tank interior.

Safety device structure 10 constructed in accordance with the present invention acts as both a vacuum relief valve and a pressure relief vent-valve. Under normal operating conditions valve plug 30 is positioned as in the drawing closing off fluid communication between end portions 16 and 18. When the pressure within end portion 16 exceeds a predetermined maximum pressure the frangible element 42 ruptures thus permitting fluid flow between end portions 16 and 18. The specific design of element 42 determines above what maximum pressure element 42 will rupture. Replacement or inspection of element 42 is readily accomplished by merely removing clamp 27 which will allow access to valve plug 30 and its component parts.

When the pressure below valve plug 30 is less than the pressure above valve plug 30 by a predetermined amount, a force results tending to push valve plug 30 downward towards its second or unseated position against the bias of spring 56 so as to permit fluid communication between end portions 18 and 16 until the force becomes less than the bias of spring 56. The magnitude of the force required to move valve plug 30 towards its second position is readily adjusted by adjusting the bias of spring 56 upon tightening or loosening nut 57.

The combination pressure-vacuum relief valve vent-valve described above may be adjusted to respond to desired pressure and vacuum conditions suitable for most applications. As will be apparent to those familar with the art, the subject safety vent-valve structure 10 can be inexpensively constructed and installed either as original equipment or upon existing tank cars.

Although an embodiment constructed in accordance with the present invention has been described with the requisite particularity, the disclosure is of course only exemplary. Consequently, numerous changes in details of construction, in size, configuration and arrangement of components and materials, and in modes of application will be apparent to those familiar with the art and may be resorted to without departing from the scope of the invention.

What is claimed is:

1. A combination pressure-vacuum relief vent-valve for use in preventing the build up of excess pressure or vacuum within a closed container, said vent-valve comprising: a body defining a chamber having a first end adapted to communicate with the interior of said closed container and a second end adapted to communicate with the exterior of said closed container; valve plug means positioned within said chamber having a first position preventing fluid communication between said first and second ends and a second position permitting fluid communication between said first and second ends; said plug means being spring biased towards said first position in a manner which permits said plug means to assume said second position against said spring bias and thereby relieve vacuum in said container when the pressure differential between said first and second ends exceeds a predetermined value; a frangible element releasably secured to said valve plug means in a closing relationship to a central opening therein so as to be operative to rupture and vent excess pressure therethrough when the pressure in said first end exceeds a predetermined maximum value: a rod having one end secured to said plug valve means and movable therewith and the other end secured to a cap member positioned in covering relationship to said second end of said chamber; guide means secured to the inner surface of said body for guiding the movement of said rod and said valve plug means; and said spring bias including spring means positioned around said rod between said cover member and said guide member so as to bias said valve plug means towards said first position.

2. The invention as defined in claim 1 wherein said chamber is defined by a body portion having a first section and a second section selectively secured together adjacent said valve plug means so as to permit access to said valve plug means for replacement of said frangible element.

3. The invention as defined in claim 2 wherein a portion of the inner surface of said first section is inclined inwardly toward said second end and said valve plug means includes sealing means associated with the outer periphery thereof so as to cause a fluid tight seal between said inner surface and said valve plug means when in said first position and to define a spacing between said inner surface and said valve plug means when in said second position.

4. The invention as defined in claim 1 wherein said other end of said rod is adjustably secured to said cap member so as to permit adjustment of said spring bias.

5. The invention as defined in claim 4 further including screen means positioned between said guide means and said inner surface of said first section for preventing foreign matter from passing therethrough.

6. The invention as defined in claim 5 wherein said sealing means is an O-ring.

* * * * *